US012113372B2

(12) United States Patent
Liu

(10) Patent No.: US 12,113,372 B2
(45) Date of Patent: Oct. 8, 2024

(54) COMMUNICATION METHOD AND APPARATUS, POWER TRANSMITTING DEVICE, AND POWER RECEIVING DEVICE

(71) Applicant: Beijing Xiaomi Mobile Software Co., Ltd., Beijing (CN)

(72) Inventor: Yang Liu, Beijing (CN)

(73) Assignee: Beijing Xiaomi Mobile Software Co., Ltd., Beijing (CN)

(*) Notice: Subject to any disclaimer, the term of this patent is extended or adjusted under 35 U.S.C. 154(b) by 636 days.

(21) Appl. No.: 17/261,451

(22) PCT Filed: Jul. 20, 2018

(86) PCT No.: PCT/CN2018/096516
§ 371 (c)(1),
(2) Date: Jan. 19, 2021

(87) PCT Pub. No.: WO2020/014982
PCT Pub. Date: Jan. 23, 2020

(65) Prior Publication Data
US 2021/0242726 A1 Aug. 5, 2021

(51) Int. Cl.
*H02J 50/80* (2016.01)
*H02J 50/10* (2016.01)
(Continued)

(52) U.S. Cl.
CPC .............. *H02J 50/80* (2016.02); *H02J 50/10* (2016.02); *H04W 4/06* (2013.01); *H04W 52/00* (2013.01)

(58) Field of Classification Search
None
See application file for complete search history.

(56) References Cited

U.S. PATENT DOCUMENTS 8,892,108 B2 11/2014 Borran et al.
9,054,547 B2 6/2015 Byun et al.
(Continued)

FOREIGN PATENT DOCUMENTS

| CN | 1791017 A | 6/2006 |
|----|-----------|--------|
| CN | 101896795 A | 11/2010 |

(Continued)

OTHER PUBLICATIONS

State Intellectual Property Office of the People's Republic of China, Office Action and Search Report Issued in Application No. 201880001065.4, Jun. 2, 2021, 11 pages.
(Continued)

*Primary Examiner* — Pablo N Tran
(74) *Attorney, Agent, or Firm* — Finnegan, Henderson, Farabow, Garrett & Dunner, L.L.P.

(57) ABSTRACT

The present disclosure provides communication methods and apparatuses, a power transmitting device, a power receiving device, and computer readable storage mediums. The communication method includes: transmitting a broadcast signal when detecting a load change of the PTX, where the broadcast signal carries a communication mode supported by the PTX and a current load state; charging a first PRX after a handshake communication with the first PRX; receiving a communication state reported by the first PRX according to the broadcast signal; and communicating with the first PRX according to the communication state. In examples of the present disclosure, by transmitting a broadcast signal after detecting a load change, receiving a communication state reported by the first PRX according to the broadcast signal, and communicating with the first PRX according to the communication state, the PTX may communicate with the PRX without affecting the charging efficiency.

14 Claims, 13 Drawing Sheets

(51) Int. Cl.
*H04W 4/06* (2009.01)
*H04W 52/00* (2009.01)

(56) References Cited

U.S. PATENT DOCUMENTS

| | | | | |
|---|---|---|---|---|
| 10,651,693 | B2* | 5/2020 | Yoon | H02J 50/10 |
| 11,522,391 | B2* | 12/2022 | Li | H02J 50/12 |
| 11,546,018 | B2* | 1/2023 | Liu | H04B 5/0037 |
| 11,664,669 | B2* | 5/2023 | Schneider | H01F 27/28 |
| | | | | 320/108 |
| 11,750,039 | B2* | 9/2023 | Ahn | H02J 50/402 |
| | | | | 307/104 |
| 11,901,744 | B2* | 2/2024 | Onishi | H02J 50/80 |
| 11,979,038 | B2* | 5/2024 | Granito | H02J 50/90 |
| 2011/0115303 | A1 | 5/2011 | Baarman et al. | |
| 2014/0094116 | A1 | 4/2014 | Walley et al. | |
| 2020/0076474 | A1* | 3/2020 | Daga | H02J 50/12 |

FOREIGN PATENT DOCUMENTS

| | | | |
|---|---|---|---|
| CN | 102714430 | A | 10/2012 |
| CN | 103715780 | A | 4/2014 |
| CN | 104756358 | A | 7/2015 |
| CN | 104854797 | A | 8/2015 |
| CN | 106684984 | A | 5/2017 |
| KR | 20150110405 | A | 10/2015 |
| WO | WO 2015/142142 | A1 | 9/2015 |

OTHER PUBLICATIONS

ISA State Intellectual Property Office of the People's Republic of China, Written Opinion of the International Searching Authority Issued in Application No. PCT/CN2018/096516, Apr. 10, 2019, 8 pages.
European Patent Office, Extended European Search Report Issued in Application No. 18926735.4, Jun. 29, 2021, 8 pages.
European Patent Office, Office Action issued in Application No. 18926735.4, Sep. 13, 2023, 3 pages.
State Intellectual Property Office of the People's Republic of China, Office Action and Search Report Issued in Application No. 201880001065.4, Feb. 8, 2022, 23 pages.
European Patent Office, Office Action issued in Application No. 18926735.4, May 19, 2022, 4 pages.
ISA State Intellectual Property Office of the People's Republic of China, International Search Report Issued in Application No. PCT/CN2018/096516, Apr. 10, 2019, WIPO, 4 pages.

* cited by examiner

COMMUNICATION METHOD AND APPARATUS, POWER TRANSMITTING DEVICE, AND POWER RECEIVING DEVICE

CROSS REFERENCE TO RELATED APPLICATIONS

This application is a national phase application based on International Application No. PCT/CN2018/096516, filed Jul. 20, 2018, the content of which is incorporated herein by reference.

TECHNICAL FIELD

The present disclosure relates to the field of communication technology, and in particular, to communication methods and apparatuses, power transmitting devices, power receiving devices and computer-readable storage mediums.

BACKGROUND

At present, the Wireless Power Consortium (WPC) standard adopts the way of in-band communication, for example, performing a handshake communication based on the frequency band of about 124k. Since traffic of handshake information is very small, the in-band communication can meet the demand. But with the evolution and development of the communication technology, the rate of the in-band communication is too low to meet the demand of new applications, so out-of-band communication needs to be introduced.

The out-of-band communication which is relatively mature at present includes near field communication (NFC) and Bluetooth Low Energy (abbreviated as "BLE"). However, for most devices, it is impossible to introduce NFC and BLE at the same time. If only one communication mode is introduced while a charging panel corresponds to another communication mode, it will cause incompatibility and lead to communication impossibility. Therefore, when there is one-to-one correspondence between a power transmitter (PTX) device and a power receiver (PRX) device, the in-band communication is usually adopted with the corporation of the out-of-band communication in consideration. However, because a PTX device (charging panel) can charge in a one-to-many way, when a PRX device has been working on the charging panel, other later-entering devices cannot perform the in-band communication with the charging panel to select whether NFC or BLE as an extended communication mode. Therefore, a new mechanism is required in the in-band communication to cope with non-simultaneous entering of multiple devices in a one-to-many charging scenario.

In the one-to-many charging scenario, suppose that PRX1 is a to-be-charged device accessing the PTX first, and PRX2 is another to-be-charged device accessing the PTX later. If PRX1 supports Bluetooth, PRX2 does not support Bluetooth but supports NFC, then it is required for the PTX and PRX2 to know each other's situation through the in-band communication. However, at this time, both the PTX and PRX1 are in the out-of-band communication, resulting in the communication between the PTX and PRX2 blocked, so it is necessary to provide a scheme for the PTX and PRX2 to communicate. If PRX2 only supports the in-band communication, the PTX may perform the in-band communication with PRX2 while performing the Bluetooth communication with PRX1, and the main task of the PTX is to charge PRX1 and PRX2. However, the in-band communication between the PTX and PRX2 will affect the system charging efficiency.

Therefore, in the one PTX-to-many PRXs scenario, the current scheme does not consider about how to communicate the PTX and PRX2 without affecting the charging efficiency.

SUMMARY

In view of this, this application discloses communication methods and apparatuses, power transmitting devices, power receiving devices and computer-readable storage mediums, so as to achieve communication between a PTX and a PRX without affecting the charging efficiency in a one PTX-to-multiple PRXs scenario.

According to a first aspect of the examples of the present disclosure, there is provided a communication method, applied to a power transmitter (PTX) supporting multiple coils, and comprising:
  transmitting a broadcast signal in response to detecting a load change of the PTX, where the broadcast signal carries a communication mode supported by the PTX and a current load state;
  charging a first PRX after a handshake communication with the first PRX;
  receiving a communication state reported by the first PRX according to the broadcast signal; and
  communicating with the first PRX according to the communication state.
In an example, the method further comprises:
  charging a second PRX before transmitting the broadcast signal after detecting the load change of the PTX.
In an example, the method further comprises:
  retransmitting a broadcast signal when detecting that the second PRX has been removed;
  receiving a communication request transmitted by the first PRX according to the current broadcast signal, wherein the communication request is configured to request the PTX returning to an in-band enhanced communication state;
  performing an in-band enhanced communication with the first PRX according to the communication request.
In an example, the method further comprises:
  after performing the in-band enhanced communication with the first PRX according to the communication request, performing an out-of-band communication with a third PRX when detecting access by the third PRX supporting the out-of-band communication;
  transmitting, to the first PRX, instruction information configured to instruct reducing an in-band communication rate to a preset rate;
  performing a low rate in-band communication with the first PRX at the preset rate.
In an example, the method further comprises:
  agreeing on a low rate in-band communication mode with a PRX including the first PRX;
  the communicating with the first PRX according to the communication state, comprises:
  performing a low rate in-band communication with the first PRX in the low rate in-band communication mode according to the low rate communication state.
In an example, the transmitting a broadcast signal after detecting a load change of the PTX, comprises:
  transmitting the broadcast signal periodically at a fixed location after detecting the load change of the PTX.

According to a second aspect of the examples of the present disclosure, there is provided a communication method, applied to a power receiver (PRX), and comprising:
  receiving a broadcast signal transmitted by a power transmitter (PTX);
  receiving power from the PTX after a handshake communication with the PTX;
  reporting a communication state to the PTX when determining that there is other load accessing the PTX according to the broadcast signal;
  communicating with the PTX according to the communication state.

In an example, the method further comprises:
  receiving an updated broadcast signal transmitted by the PTX after communicating with the PTX according to the low rate communication state;
  transmitting a communication request to the PTX according to the current broadcast signal, where the communication request is configured to request the PTX returning to an in-band enhanced communication state;
  performing an in-band enhanced communication with the PTX.

In an example, the method further comprises:
  receiving instruction information transmitted by the PTX after performing the in-band enhanced communication with the PTX, where the instruction information is configured to instruct reducing an in-band communication rate to a preset rate;
  performing a low rate in-band communication with the PTX at the preset rate according to the instruction information.

In an example, the method further comprises:
  agreeing on a low rate in-band communication mode with the PTX;
  the communicating with the PTX according to the communication state, comprises:
  performing a low rate in-band communication with the PTX in the low rate in-band communication mode according to the low rate communication state.

In an example, the receiving a broadcast signal transmitted by a PTX, comprises:
  detecting a broadcast signal at a fixed location in a current period;
  receiving the broadcast signal when detecting the broadcast signal successfully.

According to a third aspect of the examples of the present disclosure, there is provided a communication apparatus, applied to a power transmitter (PTX) supporting multiple coils, and comprising:
  a transmission module configured to transmit a broadcast signal when detecting a load change of the PTX, where the broadcast signal carries a communication mode supported by the PTX and a current load state;
  a charging module configured to charge a first PRX after a handshake communication with the first PRX;
  a first reception module configured to receive a communication state reported by the first PRX according to the broadcast signal transmitted by the transmission module while the charging module charges the first PRX; and
  a first communication module configured to communicate with the first PRX according to the communication state received by the first reception module.

In an example, the charging module is further configured to charge a second PRX before the transmission module transmits the broadcast signal after detecting the load change of the PTX.

In an example, the apparatus further comprises:
  a detection and transmission module configured to retransmit a broadcast signal when detecting that the second PRX serving as a charging target of the charging module has been removed;
  a second reception module configured to receive a communication request transmitted by the first PRX according to the current broadcast signal transmitted by the detection and transmission module, where the communication request is configured to request the PTX returning to an in-band enhanced communication state;
  a second communication module configured to perform an in-band enhanced communication with the first PRX according to the communication request received by the second reception module.

In an example, the apparatus further comprises:
  a third communication module configured to: after the second communication module performs the in-band enhanced communication with the first PRX according to the communication request, perform an out-of-band communication with a third PRX when detecting access by the third PRX supporting the out-of-band communication;
  an instruction transmission module configured to transmit instruction information to the first PRX while the third communication module performs the out-of-band communication with the third PRX, where the instruction information is configured to instruct reducing an in-band communication rate to a preset rate;
  a fourth communication module configured to perform a low rate in-band communication with the first PRX at the preset rate instructed by the instruction information transmitted by the instruction transmission module.

In an example, the apparatus further comprises:
  an agreeing module configured to agree on a low rate in-band communication mode with a PRX including the first PRX;
  the first communication module is configured to perform a low rate in-band communication with the first PRX in the low rate in-band communication mode agreed on by the agreeing module according to the low rate communication state.

In an example, the transmission module is configured to:
  transmit the broadcast signal periodically at a fixed location after detecting a load change of the PTX.

According to a fourth aspect of the examples of the present disclosure, there is provided a communication apparatus, applied to a power receiver (PRX), and comprising:
  a first reception module configured to receive a broadcast signal transmitted by a power transmitter (PTX);
  a second reception module configured to receive power from the PTX after a handshake communication with the PTX;
  a reporting module configured to report a communication state to the PTX when determining that there is other load accessing the PTX according to the broadcast signal received by the first reception module while the second reception module receives power from the PTX;
  a first communication module configured to communicate with the PTX according to the communication state reported by the reporting module.

In an example, the apparatus further comprises:
  a third reception module configured to receive an updated broadcast signal transmitted by the PTX after the first communication module communicates with the PTX according to the low rate communication state;

a first transmission module configured to transmit a communication request to the PTX according to the current broadcast signal received by the third reception module, where the communication request is configured to request the PTX returning to an in-band enhanced communication state;

a second communication module configured to perform an in-band enhanced communication with the PTX after the first transmission module transmits the communication request.

In an example, the apparatus further comprises:

a fourth reception module configured to receive instruction information transmitted by the PTX after the second communication module performs the in-band enhanced communication with the PTX, where the instruction information is configured to instruct reducing an in-band communication rate to a preset rate;

a third communication module configured to perform a low rate in-band communication with the PTX at the preset rate according to the instruction information received by the fourth reception module.

In an example, the apparatus further comprises:

an agreeing module configured to agree on a low rate in-band communication mode with the PTX;

the first communication module is configured to perform a low rate in-band communication with the PTX in the low rate in-band communication mode according to the low rate communication state.

In an example, the first reception module comprises:

a detection submodule configured to detect a broadcast signal at a fixed location in a current period;

a reception submodule configured to receive the broadcast signal when that the detection submodule detects the broadcast signal successfully.

According to a fifth aspect of the examples of the present disclosure, there is provided a power transmitting device, comprising:

a processor;

a storage storing instructions executable by the processor;

where the processor is configured to:

transmit a broadcast signal when detecting a load change of the PTX, where the broadcast signal carries a communication mode supported by the PTX and a current load state; charge a first PRX after a handshake communication with the first PRX;

receive a communication state reported by the first PRX according to the broadcast signal; and communicate with the first PRX according to the communication state.

According to a sixth aspect of the examples of the present disclosure, there is provided a power receiving device, comprising:

a processor;

a storage storing instructions executable by the processor;

where the processor is configured to:

receive a broadcast signal transmitted by a power transmitter (PTX);

receive power from the PTX after a handshake communication with the PTX;

report a communication state to the PTX when determining that there is other load accessing the PTX according to the broadcast signal;

communicate with the PTX according to the communication state.

According to a seventh aspect of the examples of the present disclosure, there is provided a computer readable storage medium storing computer instructions, where the instructions are executed by a processor to implement the steps of the above communication methods.

According to an eighth aspect of the examples of the present disclosure, there is provided computer readable storage medium storing computer instructions, where the instructions are executed by a processor to implement the steps of the above communication methods.

The technical solutions provided in the examples of the present disclosure may include the benefit effects:

by transmitting a broadcast signal after detecting a load change of the PTX, receiving a communication state reported by a first PRX according to the broadcast signal, and communicating with the first PRX according to the communication state, the PTX can communicate with the PRX without affecting the charging efficiency;

by receiving a broadcast signal transmitted by the PTX, reporting a communication state to the PTX when determining that there is other load accessing the PTX according to the broadcast signal, and communicating with the PTX according to the communication state, the PRX can communicate with the PTX without affecting the charging efficiency.

It should be understood that the above general description and the following detailed description are only exemplary and explanatory and are not restrictive of the present disclosure.

BRIEF DESCRIPTION OF THE DRAWINGS

The accompanying drawings, which are incorporated in and constitute a part of this specification, illustrate examples consistent with the present disclosure and, together with the description, serve to explain the principles of the disclosure.

DETAILED DESCRIPTION OF THE EMBODIMENTS

Figure 1:
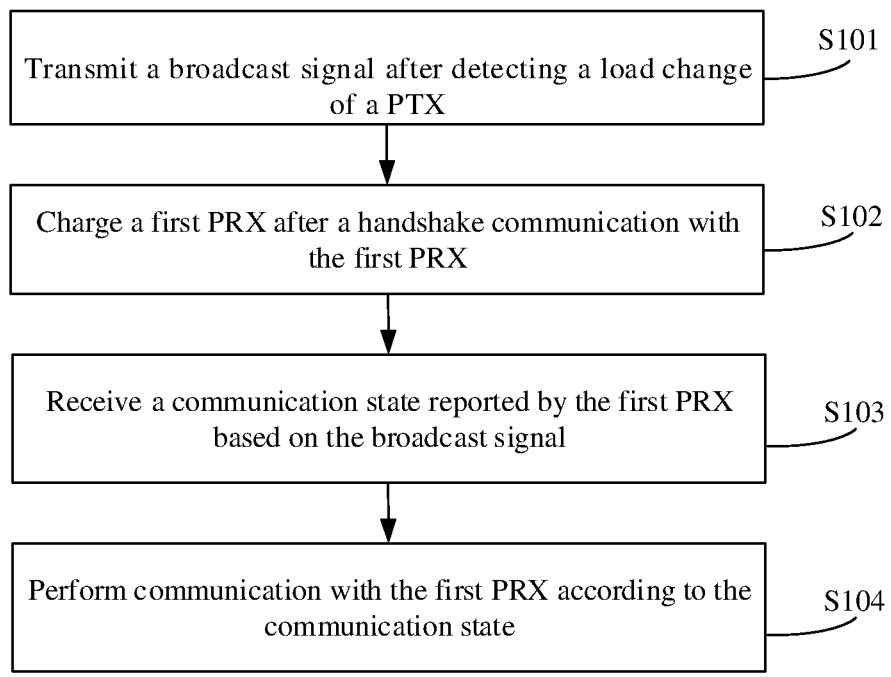
FIG. 1 is a flowchart illustrating a communication method according to an example of the present disclosure.

Examples will be described in detail herein, with the illustrations thereof represented in the drawings. When the following descriptions involve the drawings, like numerals in different drawings refer to like or similar elements unless otherwise indicated. The embodiments described in the following examples do not represent all embodiments consistent with the present disclosure. Rather, they are merely examples of apparatuses and methods consistent with some aspects of the present disclosure as detailed in the appended claims.

FIG. 1 is a flowchart illustrating a communication method according to an example of the present disclosure. In the example, the method is described in the perspective of the PTX side supporting multiple coils, and includes the steps as shown in FIG. 1.

At step S101, after detecting a load change of the PTX, the PTX transmits a broadcast signal carrying a communication mode supported by the PTX and a current load state.

After the PTX detects the load change of the PTX, for example, detecting that a first power receiver (PRX) accesses the PTX, the PTX can periodically send a broadcast signal at a fixed location. The broadcast signal can carry the communication mode supported by the PTX and the current load state, as shown in Table 1.

TABLE 1

| Items included in a broadcast signal | |
| --- | --- |
| Items included in a broadcast signal | Number of bits |
| Supported communication mode | 2 bits |
| Load state | 1 bit |

At step S102, the PTX charges the first PRX after a handshake communication with the first PRX.

At step S103, the PTX receives a communication state reported by the first PRX based on the broadcast signal.

When receiving the broadcast signal, the first PRX may confirm whether there is other load accessing the PTX based on the received broadcast signal, and report the communication state to the PTX accordingly. The communication state may include a low rate communication state.

At step S104, the PTX performs communication with the first PRX according to the communication state.

In an example, the method may also include: agreeing on a low rate in-band communication mode with the PRX. For example, the PTX agrees on a low rate in-band communication mode with the first PRX. The low rate in-band communication mode corresponds to a low rate communication state.

When the received communication state is the low rate communication state, the PTX may perform a low rate in-band communication with the first PRX in a low rate in-band communication mode according to the low rate communication state.

In the above-mentioned example, by sending a broadcast signal after detecting load change, the PTX may receive a communication state reported by the first PRX according to the broadcast signal, and communicate with the first PRX according to the communication state, achieving the communication between the PRX and PTX without affecting the charging efficiency.

Figure 2:
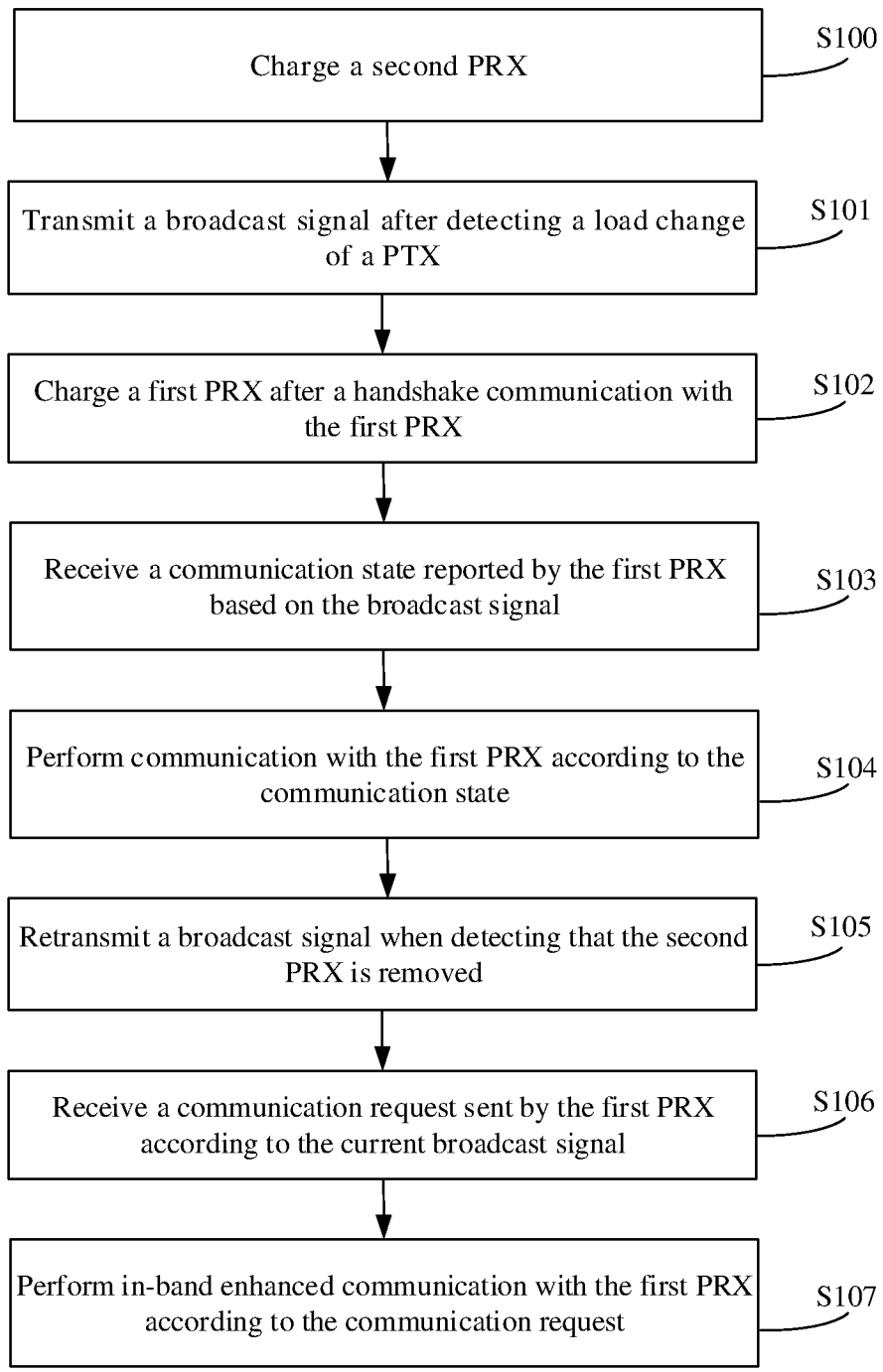
FIG. 2 is a flowchart illustrating another communication method according to an example of the present disclosure.

FIG. 2 is a flow chart of another communication method according to an example of the present disclosure. As shown in FIG. 2, before step S101, the communication method may further include the following.

At step S100, the PTX may charge a second PRX.

Since the PTX supports multiple coils, it may charge multiple PRXs at the same time, for example, charge the first PRX and the second PRX at the same time.

It should be noted that the first PRX and the second PRX are merely named to distinguish different PRXs, the "first" and the "second" have a relative relationship, and are not used to restrict the identification of the PRX.

Optionally, after the above step S104, the method may further include the following.

At step S105, the PTX may retransmit a broadcast signal when detecting that the second PRX is removed.

If the PTX detects that the second PRX has been removed, that is, detects that its load has changed again, it retransmits the broadcast signal.

At step S106, the PTX may receive a communication request sent by the first PRX according to the current broadcast signal, where the communication request is configured to request the PTX to return to an in-band enhanced communication state.

The first PRX may know that the second PRX has been removed according to the current broadcast signal, and then request the PTX to return to the in-band enhanced communication state, so as to improve the communication efficiency.

At step S107, the PTX may perform in-band enhanced communication with the first PRX according to the communication request.

In the above example, if it is detected that the second PRX has been removed, the PTX may retransmit a broadcast signal, receive a communication request sent by the first PRX according to the current broadcast signal, and perform in-band enhanced communication with the first PRX according to the communication request, so as to improve the communication efficiency without affecting the charging efficiency.

Figure 3:
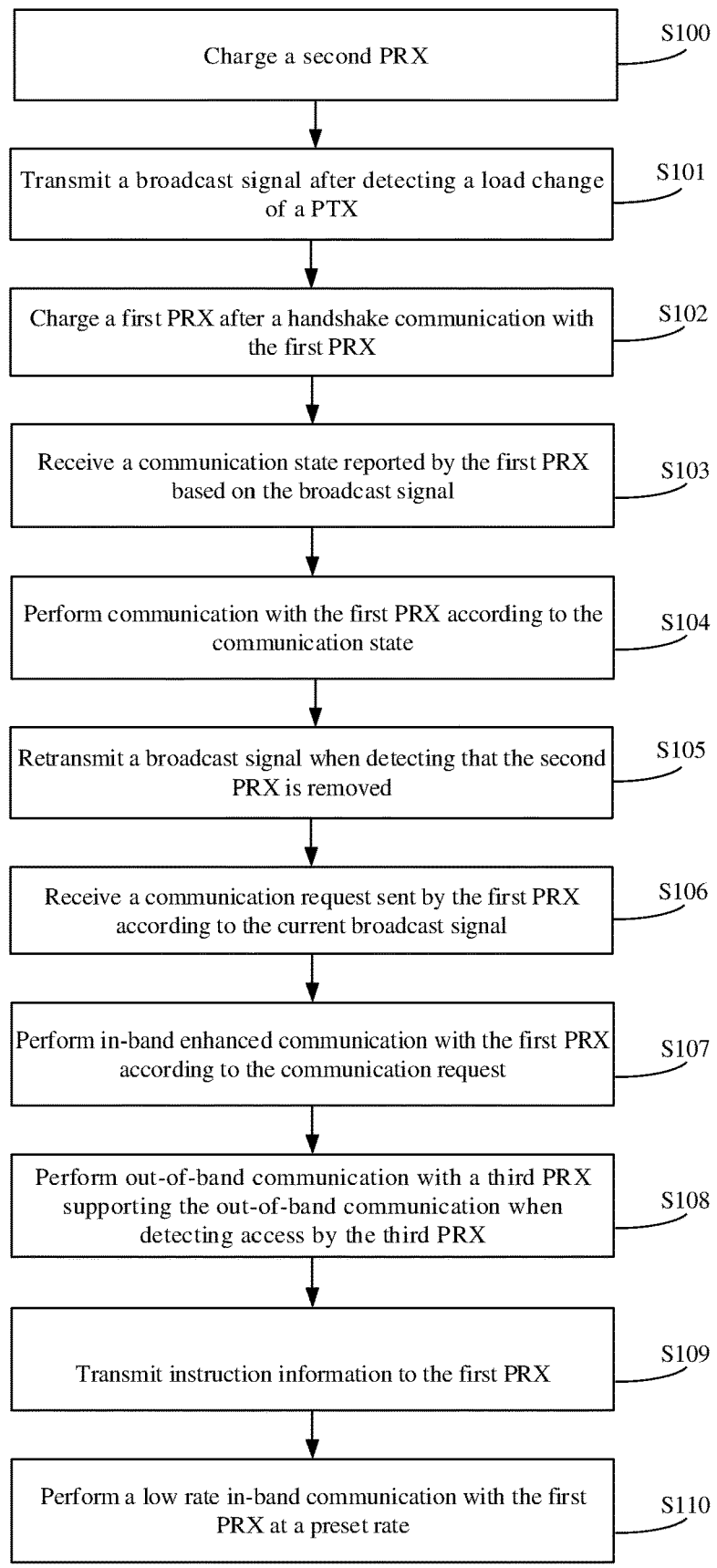
FIG. 3 is a flowchart illustrating another communication method according to an example of the present disclosure.

FIG. 3 is a flow chart of another communication method according to an example of the present disclosure. As shown in FIG. 3, after the above step S107, the communication method may further include the following.

At step S108, if it is detected that a third PRX supporting out-of-band communication accesses the PTX, the PTX performs out-of-band communication with the third PRX.

Since the out-of-band communication does not affect the charging efficiency, the PTX may perform the out-of-band communication with the third PRX supporting the out-of-band communication when the third PRX is detected to access the PTX.

In step S109, the PTX may transmit instruction information to the first PRX, where the instruction information is configured to instruct reducing the in-band communication rate to a preset rate.

The preset rate and the rate corresponding to the low rate in-band communication mode can be the same or different.

At step S110, the PTX may perform a low rate in-band communication with the first PRX at a preset rate.

In order to reduce the influence on the charging efficiency of the first PRX due to the access by the third PRX, in the examples, the PTX may transmit the instruction information to the first PRX, and perform a low rate in-band communication with the first PRX at a preset rate, thereby reducing the influence of the communication on the charging efficiency.

In the above examples, when detecting the access by the third PRX supporting out-of-band communication, the PTX may perform out-of-band communication with the third PRX, and transmit, to the first PRX, instruction information configured to instruct reducing the in-band communication rate to a preset rate, and perform a low rate in-band communication with the first PRX at the preset rate, so as to reduce the influence of the communication on the charging efficiency.

Figure 4:
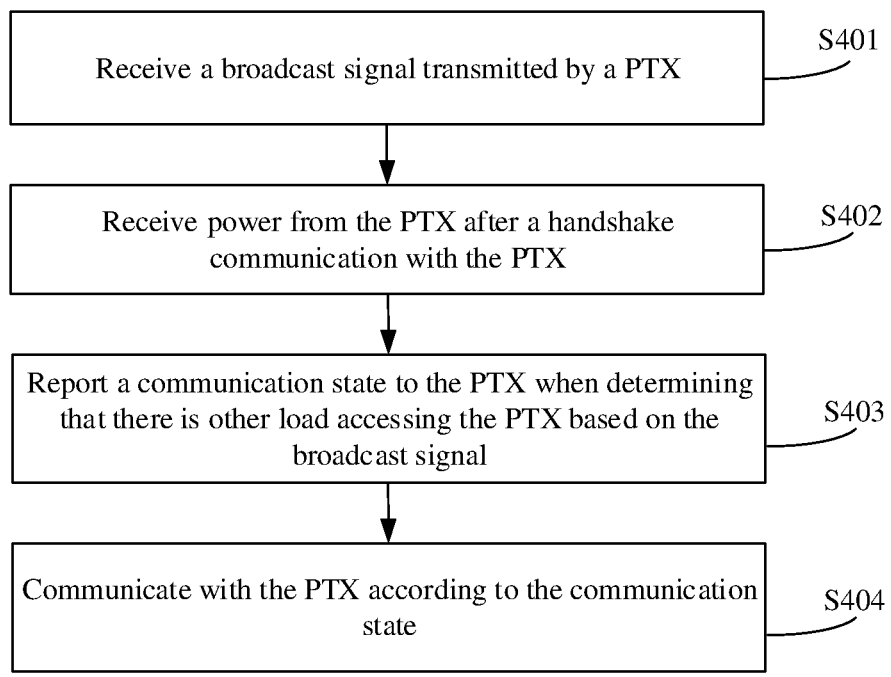
FIG. 4 is a flowchart illustrating another communication method according to an example of the present disclosure.

FIG. 4 is a flow chart of another communication method according to an example of the present disclosure. In the example, the method is described in the perspective of the PRX side, and includes the steps as shown in FIG. 4.

At step S401, the PRX may receive a broadcast signal transmitted by a PTX.

The PRX may detect a broadcast signal at a fixed location in a current period, and receive the broadcast signal if the broadcast signal is detected successfully.

At step S402, the PRX may receive power from the PTX after a handshake communication with the PTX.

At step S403, the PRX may report a communication state to the PTX if it determines that there is other load accessing the PTX based on the broadcast signal.

For example, if PRX2 determines that there is another load PRX1 accessing the PTX according to the broadcast signal, PRX2 may report a communication state to the PTX, where the communication state may include a low rate communication state.

At step S404, the PRX may communicate with the PTX according to the communication state.

In an example, the method may also include: agreeing on a low rate in-band communication mode with the PTX. The low rate in-band communication mode corresponds to the low rate communication state.

When the communication state is the low rate communication state, the PRX may perform the low rate in-band communication with the PTX in a low rate in-band communication mode according to the low rate communication state.

In the above examples, by receiving a broadcast signal sent by the PTX, the PRX may determine that there is other load accessing the PTX according to the broadcast signal, report the communication state to the PTX, and communicate with the PTX according to the communication state, so as to realize the communication with the PTX without affecting the charging efficiency.

Figure 5:
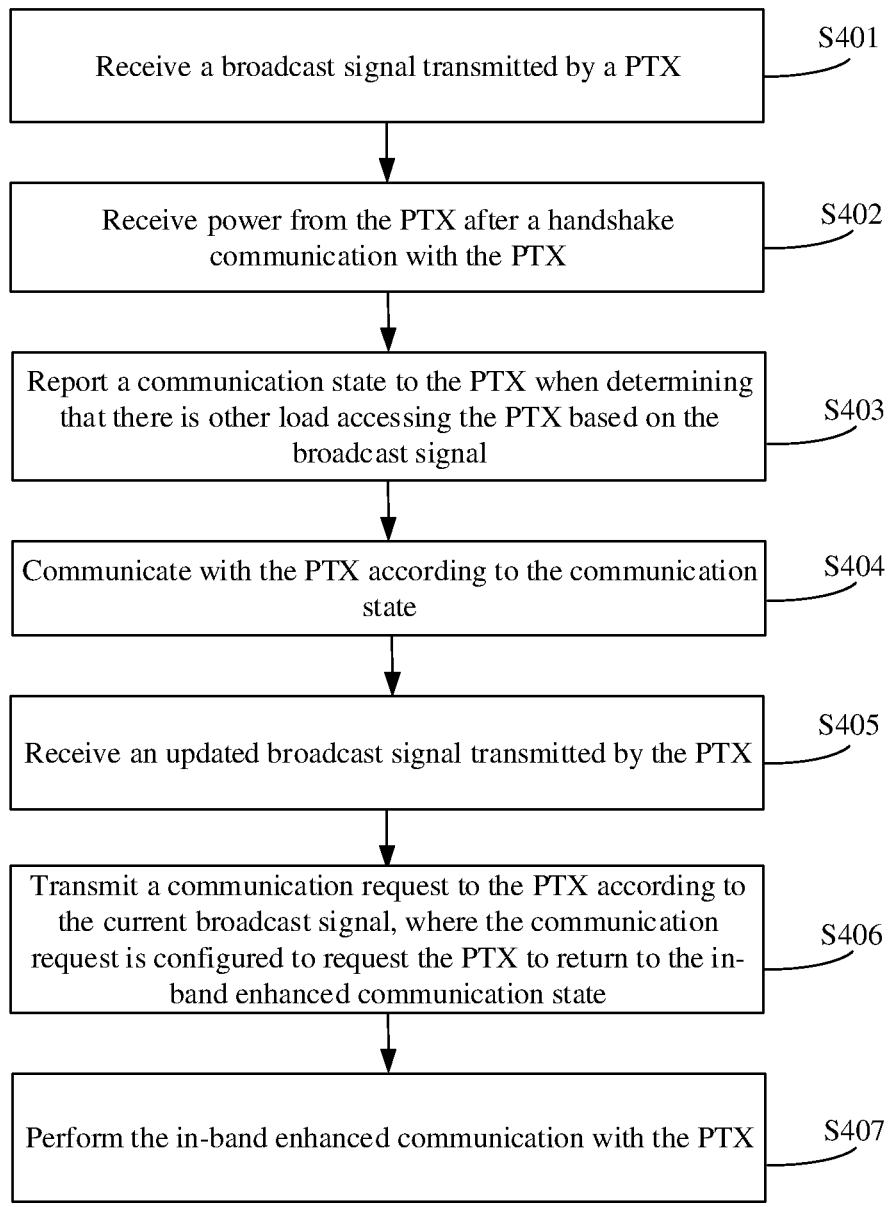
FIG. 5 is a flowchart illustrating another communication method according to an example of the present disclosure.

FIG. 5 is a flow chart of another communication method according to an example of the present disclosure. As shown in FIG. 5, after the above step S404, the communication method may further include the following.

At step S405, the PRX may receive an updated broadcast signal transmitted by the PTX.

If the PTX detects a load change again, it retransmits the broadcast signal.

In step S406, the PRX may transmit a communication request to the PTX according to the current broadcast signal, where the communication request is configured to request the PTX to return to the in-band enhanced communication state.

When determining that the PTX has removed other load according to the current broadcast signal, the PRX may request the PTX to return to the in-band enhanced communication state.

At step S407, the PRX may perform the in-band enhanced communication with the PTX.

In the above example, the PRX may receive the updated broadcast signal transmitted by the PTX, transmit a communication request to the PTX according to the current broadcast signal, and perform the in-band enhanced communication with the PTX. In such way, the communication efficiency can be improved without affecting the charging efficiency.

Figure 6:
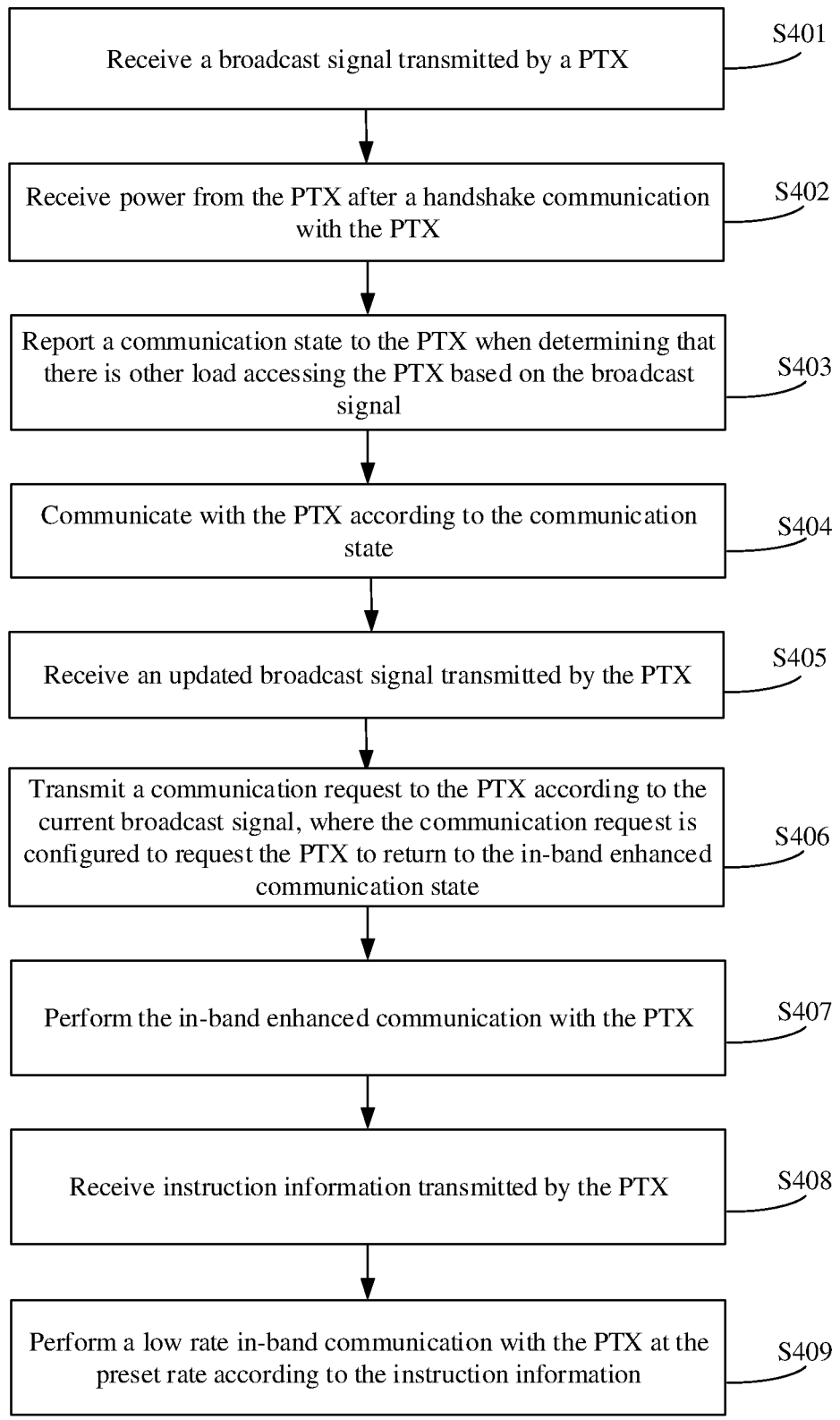
FIG. 6 is a flowchart illustrating another communication method according to an example of the present disclosure.

FIG. 6 is a flow chart of another communication method according to an example of the present disclosure. As shown in FIG. 6, after the above step S407, the communication method may further include the following.

In step S408, the PRX may receive instruction information transmitted by the PTX, where the instruction information is configured to instruct reducing the in-band communicate rate to a preset rate.

In step S409, the PRX may perform a low rate in-band communication with the PTX at the preset rate according to the instruction information.

When the PTX detects the access by the third PRX, it may transmit instruction information to the PRX, so that the PRX can perform a low rate in-band communication with the PTX at the preset rate according to the instruction information.

In the above example, the PRX may receive the instruction information transmitted by the PTX, and perform a low rate in-band communication with the PTX at a preset rate according to the instruction information, thereby reducing the influence of communication on the charging efficiency.

Figure 7:
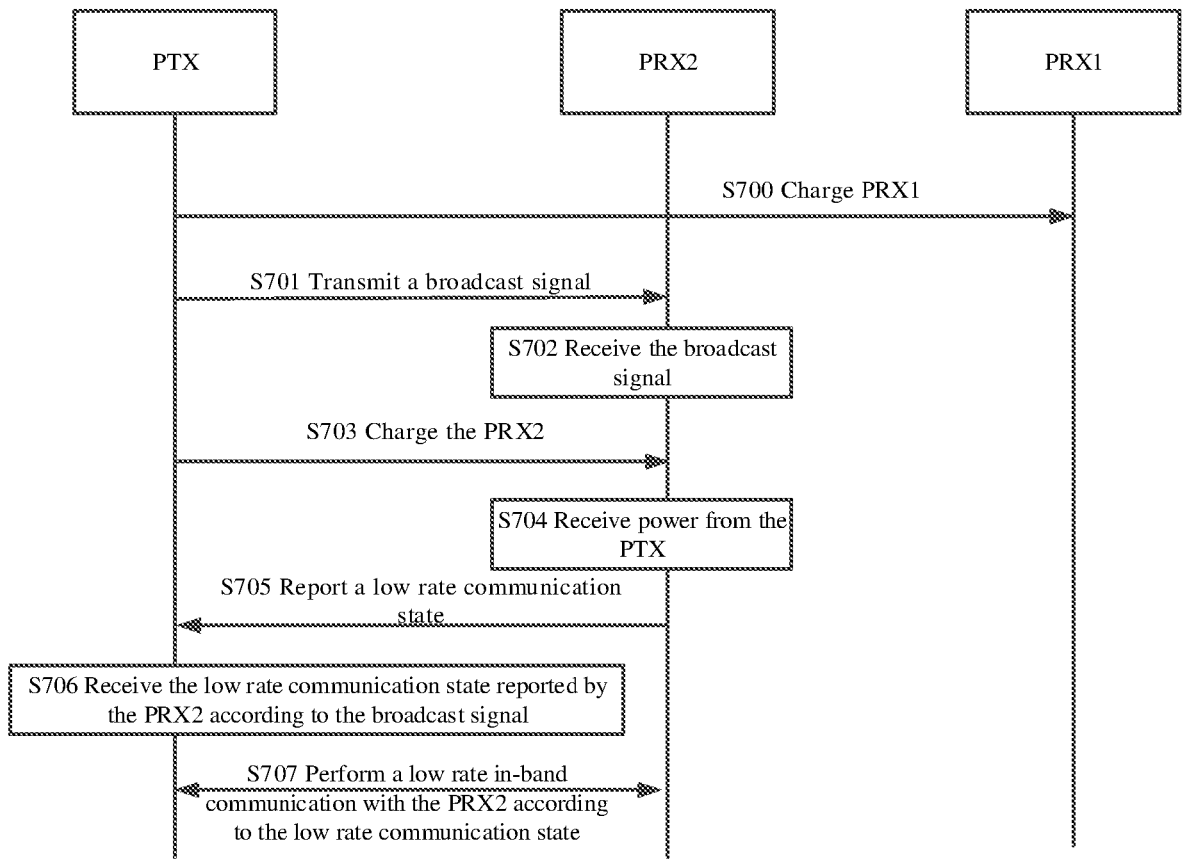
FIG. 7 is a signaling flowchart illustrating a communication method according to an example of the present disclosure.

FIG. 7 is a signaling flowchart illustrating a communication method according to an example of the present disclosure. In the example, the method is described in the perspective of interaction between the PTX and the PRX, and includes the steps as shown in FIG. 7.

At step S700, the PTX charges PRX1.

At step S701, the PTX transmits a broadcast signal after detecting the access by PRX2, where the broadcast signal carries a communication mode supported by the PTX and a current load state.

At step S702, the PRX2 receives the broadcast signal transmitted by the PTX.

At step S703, the PTX charges the PRX2 after a handshake communication between the PTX and PRX2.

At step S704, the PRX2 receives power from the PTX after the handshake communication with the PTX.

At step S705, the PRX2 reports a low rate communication state to the PTX if the PRX2 determines that there is other load accessing the PTX according to the broadcast signal.

At step S706, the PTX receives the low rate communication state reported by the PRX2 according to the broadcast signal.

At step S707, the PTX performs a low rate in-band communication with the PRX2 according to the low rate communication state.

In the above example, through the interaction between the PTX and the PRX, the PTX and the PRX2 can communicate without affecting the charging efficiency.

Figure 8:
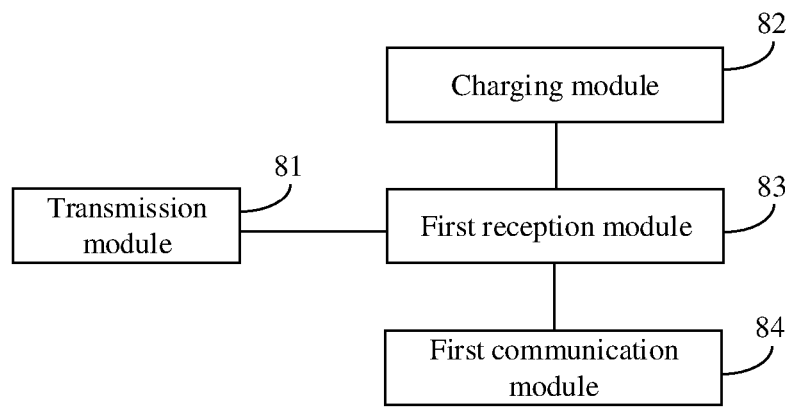
FIG. 8 is a block diagram illustrating a communication apparatus according to an example of the present disclosure.

FIG. 8 is a block diagram illustrating a communication apparatus according to an example of the present disclosure. The communication apparatus may locate within a power transmitting device supporting multiple coils. As shown in FIG. 8, the apparatus may include the following modules.

A transmission module 81 is configured to transmit a broadcast signal after detecting a load change of the PTX, where the broadcast signal carries a communication mode supported by the PTX and a current load state.

After the PTX detects its load change, for example, detecting the access by a first PRX, it may transmit a broadcast signal periodically at a fixed location, where the broadcast signal may carry a communication mode supported by the PTX and a current load state, as shown in table 1.

A charging module 82 is configured to charge a first PRX after a handshake communication with the first PRX.

In an example, the charging module 82 is further configured to charge a second PRX before the transmission module transmits the broadcast signal after detecting the load change of the PTX.

It should be noted that the first PRX and the second PRX are merely named to distinguish different PRXs, the "first" and the "second" have a relative relationship, and are not used to restrict the identification of the PRX.

A first reception module 83 is configured to receive a communication state reported by the first PRX according to the broadcast signal transmitted by the transmission module 81 while the charging module 82 charges the first PRX.

A first communication module 84 is configured to communicate with the first PRX according to the communication state received by the first reception module 83.

In the above example, by transmitting a broadcast signal after detecting a load change of the PTX, receiving a communication state reported by the first PRX according to the broadcast signal, and communicating with the first PRX according to the communication state, the PTX may communicate with the PRX without affecting the charging efficiency.

Figure 9:
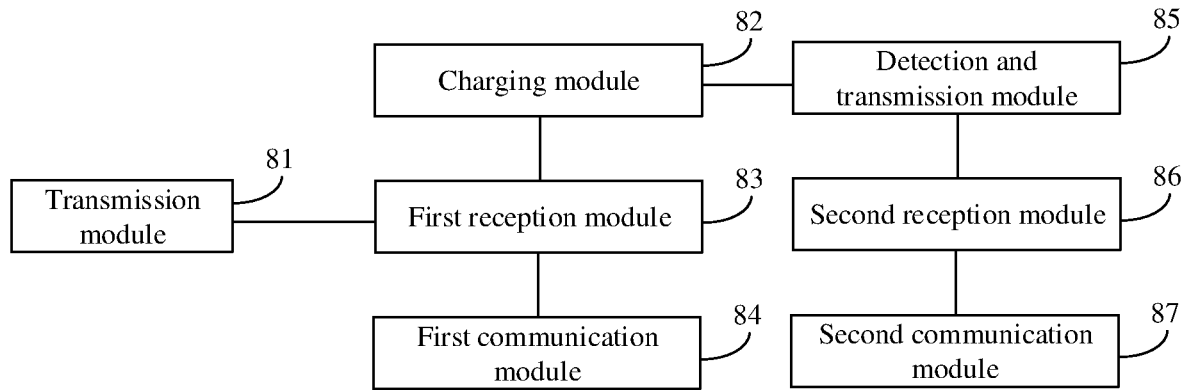
FIG. 9 is a block diagram illustrating another communication apparatus according to an example of the present disclosure.

FIG. 9 is a block diagram illustrating another communication apparatus according to an example of the present disclosure. As shown in FIG. 9, based on the example shown in FIG. 8, the apparatus further comprises the following modules.

A detection and transmission module 85 is configured to retransmit a broadcast signal when detecting that the second PRX serving as a charging target of the charging module 82 has been removed.

When the PTX detects that the second PRX has been removed, i.e., detecting the load change again, it may retransmit a broadcast signal.

A second reception module 86 is configured to receive a communication request transmitted by the first PRX according to the current broadcast signal transmitted by the detection and transmission module 85, where the communication request is configured to request the PTX returning to an in-band enhanced communication state.

The first PRX may know that the second PRX has been removed according to the current broadcast signal, and request the PTX to return to an in-band enhanced communication state in order to improve the communication efficiency.

A second communication module 87 is configured to perform an in-band enhanced communication with the first PRX according to the communication request received by the second reception module 86.

In the above example, when detecting that the second PRX has been removed, the PTX may retransmit a broadcast signal, receive a communication request transmitted by the first PRX according to the current broadcast signal, and perform an in-band enhanced communication with the first PRX, thereby improving the communication efficiency without affecting the charging efficiency.

Figure 10:
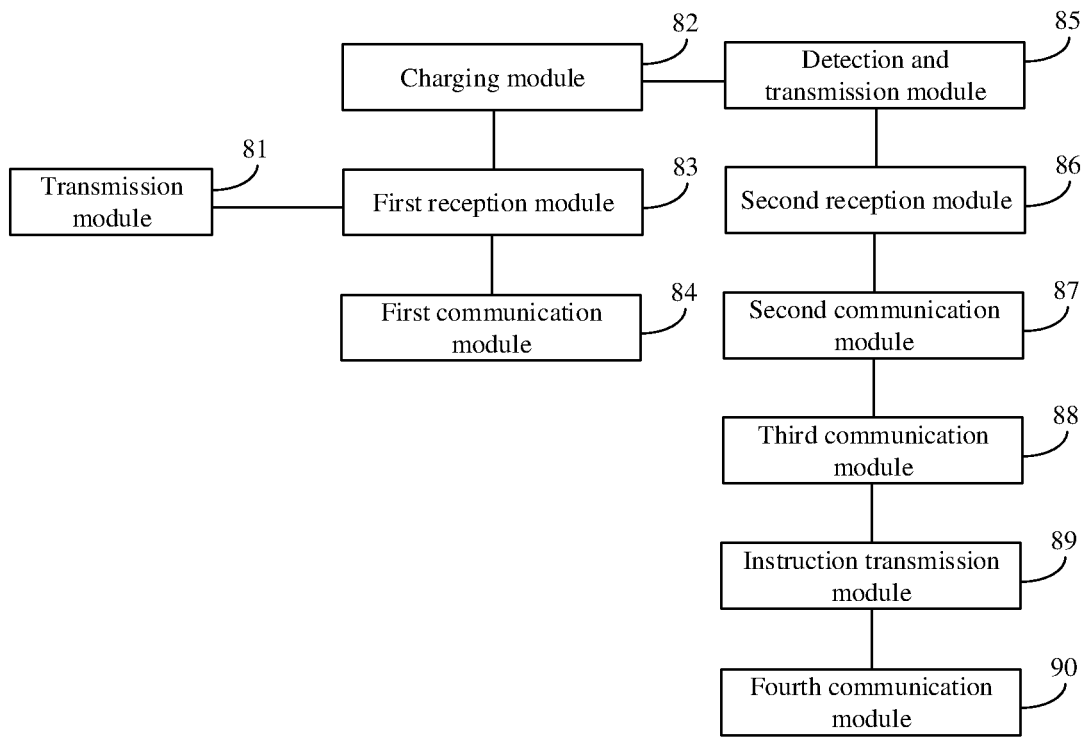
FIG. 10 is a block diagram illustrating another communication apparatus according to an example of the present disclosure.

FIG. 10 is a block diagram illustrating another communication apparatus according to an example of the present disclosure. As shown in FIG. 10, based on the example shown in FIG. 9, the apparatus further comprises the following modules.

A third communication module 88 is configured to: after the second communication module 87 performs the in-band enhanced communication with the first PRX according to the communication request, perform an out-of-band communication with a third PRX when detecting access by the third PRX supporting the out-of-band communication.

Since the out-of-band communication does not affect the charging efficiency, the PTX may perform the out-of-band communication with the third PRX when detecting the access by the third PRX supporting the out-of-band communication.

An instruction transmission module 89 is configured to transmit instruction information to the first PRX while the third communication module 88 performs the out-of-band communication with the third PRX, where the instruction information is configured to instruct reducing an in-band communication rate to a preset rate.

The preset rate and the rate corresponding to the low rate in-band communication mode may be the same or different.

A fourth communication module 90 is configured to perform a low rate in-band communication with the first PRX at the preset rate instructed by the instruction information transmitted by the instruction transmission module 89.

In order to reduce the influence on the charging efficiency of the first PRX due to the access by the third PRX, in the above example, the PTX may transmit instruction information to the first PRX, and perform a low rate in-band communication with the first PRX at a preset rate, thereby reducing the influence on the charging efficiency due to communication.

In the above example, when detecting the access by the third PRX supporting the out-of-band communication, the PTX may perform the out-of-band communication with the third PRX, transmit instruction information to the first PRX, where the instruction information is configured to instruct reducing an in-band communication rate to a preset rate, and perform a low rate in-band communication with the first PRX at the preset rate, thereby reducing the influence on the charging efficiency due to communication.

Figure 11:
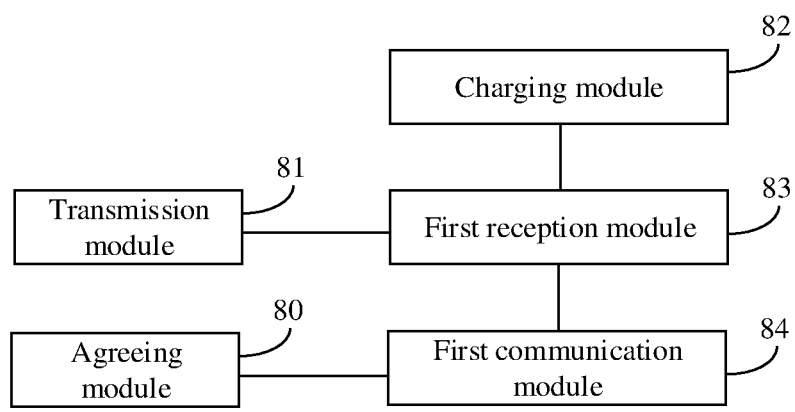
FIG. 11 is a block diagram illustrating another communication apparatus according to an example of the present disclosure.

FIG. 11 is a block diagram illustrating another communication apparatus according to an example of the present disclosure. As shown in FIG. 11, based on the example shown in FIG. 8, the apparatus further comprises the following modules.

An agreeing module 80 is configured to agree on a low rate in-band communication mode with a PRX including the first PRX.

A first communication module 84 is configured to perform a low rate in-band communication with the first PRX in the low rate in-band communication mode agreed on by the agreeing module 80 according to the low rate communication state.

In the above example, the PTX may agree on a low rate in-band communication mode with the PRX, thereby providing the execution condition for the first communication module to perform a low rate in-band communication.

Figure 12:
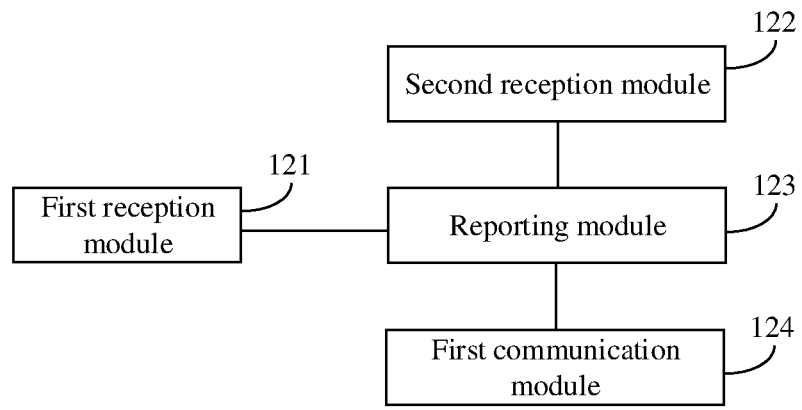
FIG. 12 is a block diagram illustrating another communication apparatus according to an example of the present disclosure.

FIG. 12 is a block diagram illustrating another communication apparatus according to an example of the present disclosure. The communication apparatus may locate within a power receiving device, and as shown in FIG. 12, the communication apparatus may comprise the following modules.

A first reception module 121 is configured to receive a broadcast signal transmitted by a power transmitter (PTX).

The PRX may detect a broadcast signal at a fixed location within the current period, and receive the broadcast signal when detecting the broadcast signal successfully.

A second reception module 122 is configured to receive power from the PTX after a handshake communication with the PTX.

A reporting module 123 is configured to report a communication state to the PTX in response to determining that there is other load accessing the PTX according to the broadcast signal received by the first reception module 121 while the second reception module 122 receives power from the PTX.

For example, if the PRX2 determines that there is other load PRX1 accessing the PTX according to the broadcast signal, it may report a communication state to the PTX, where the communication state may include a low rate communication state.

A first communication module 124 is configured to communicate with the PTX according to the communication state reported by the reporting module 123.

In the above example, the PRX may receive a broadcast signal transmitted by the PTX, report a communication state to the PTX when determining that there is other load accessing the PTX according to the broadcast signal, and communicate with the PTX according to the communication state, thereby achieving communication with the PTX without affecting the charging efficiency.

Figure 13:
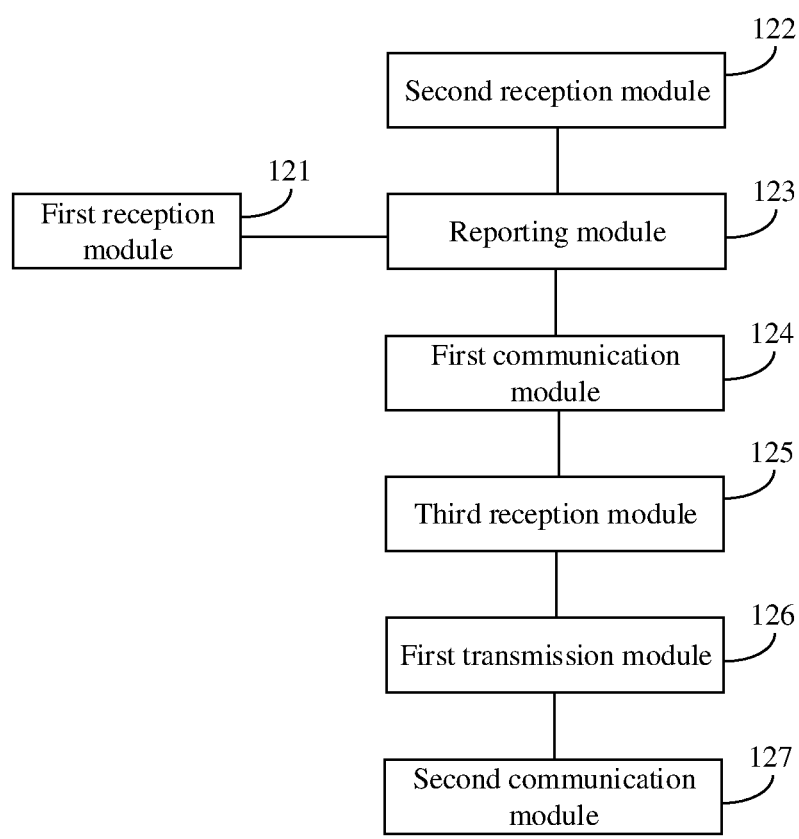
FIG. 13 is a block diagram illustrating another communication apparatus according to an example of the present disclosure.

FIG. 13 is a block diagram illustrating another communication apparatus according to an example of the present disclosure. As shown in FIG. 13, based on the example shown in FIG. 12, the apparatus further comprises the following modules.

A third reception module 125 is configured to receive an updated broadcast signal transmitted by the PTX after the first communication module 124 communicates with the PTX according to the low rate communication state.

If the PTX detects a load change again, it may retransmit a broadcast signal.

A first transmission module 126 is configured to transmit a communication request to the PTX according to the current broadcast signal received by the third reception module 125, where the communication request is configured to request the PTX returning to an in-band enhanced communication state.

When determining that the PTX has removed other load according to the current broadcast signal, the PRX may request the PTX returning to an in-band enhanced communication state.

A second communication module 127 is configured to perform an in-band enhanced communication with the PTX after the first transmission module 126 transmits the communication request.

In the above example, the PRX may receive an updated broadcast signal transmitted by the PTX, transmit a communication request to the PTX according to the current broadcast signal, and perform an in-band enhanced communication with the PTX, which can improve the communication efficiency without affecting the charging efficiency.

Figure 14:
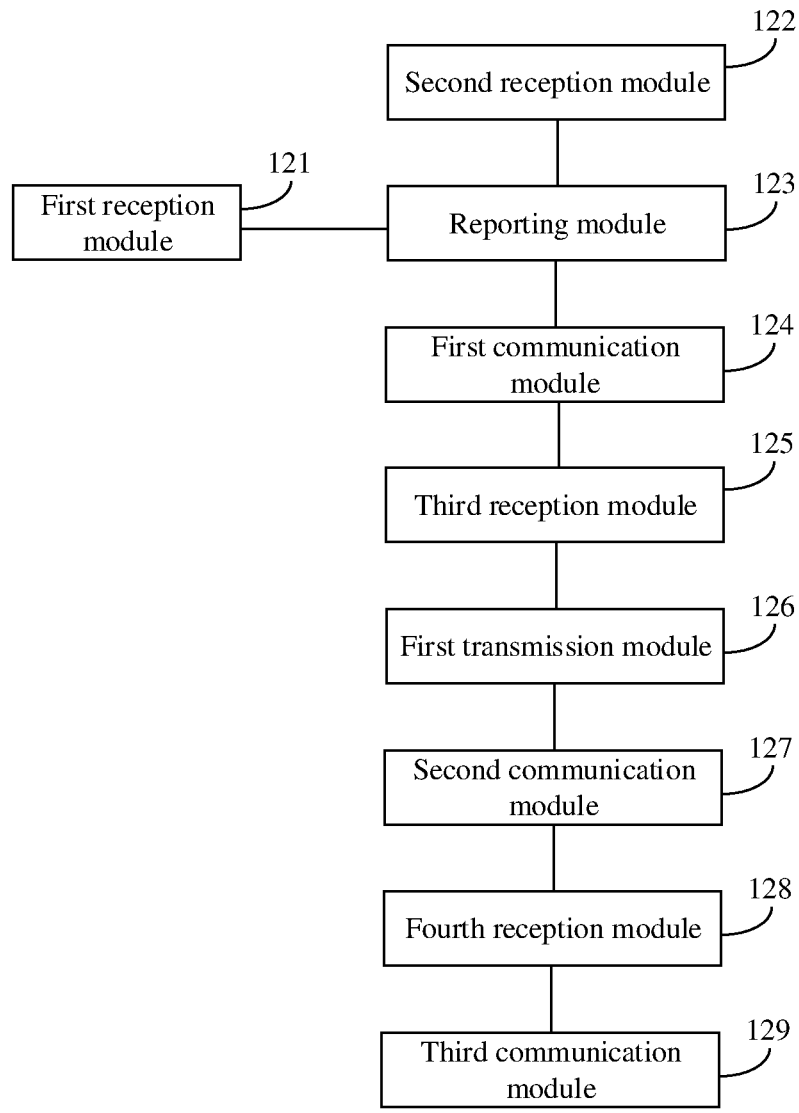
FIG. 14 is a block diagram illustrating another communication apparatus according to an example of the present disclosure.

FIG. 14 is a block diagram illustrating another communication apparatus according to an example of the present disclosure. As shown in FIG. 14, based on the example shown in FIG. 13, the apparatus further comprises the following modules.

A fourth reception module 128 is configured to receive instruction information transmitted by the PTX after the second communication module 127 performs the in-band enhanced communication with the PTX, where the instruction information is configured to instruct reducing an in-band communication rate to a preset rate.

A third communication module 129 is configured to perform a low rate in-band communication with the PTX at the preset rate according to the instruction information received by the fourth reception module 128.

In the above example, the PRX may receive instruction information transmitted by the PTX, and perform a low rate in-band communication with the PTX at a preset rate, thereby reducing the influence on the charging efficiency due to communication.

Figure 15:
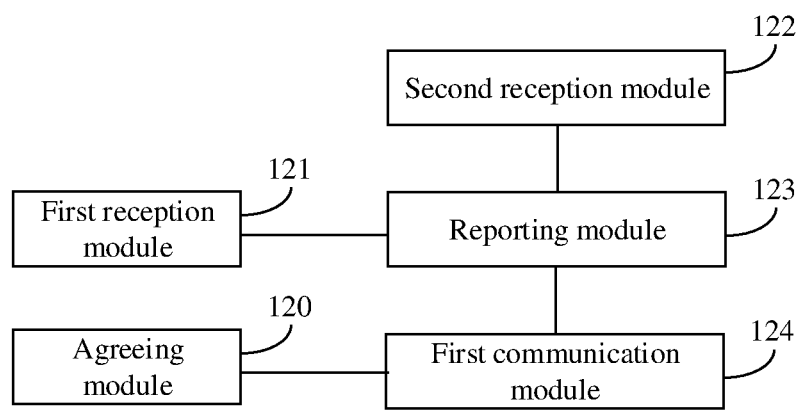
FIG. 15 is a block diagram illustrating another communication apparatus according to an example of the present disclosure.

FIG. 15 is a block diagram illustrating another communication apparatus according to an example of the present disclosure. As shown in FIG. 15, based on the example shown in FIG. 12, the apparatus further comprises the following modules.

An agreeing module 120 is configured to agree on a low rate in-band communication mode with the PTX.

The first communication module 124 is configured to perform a low rate in-band communication with the PTX in the low rate in-band communication mode according to the low rate communication state.

In the above example, the PRX may agree on a low rate in-band communication mode with the PTX, thereby providing an execution condition for a low rate in-band communication with the PTX subsequently.

Figure 16:
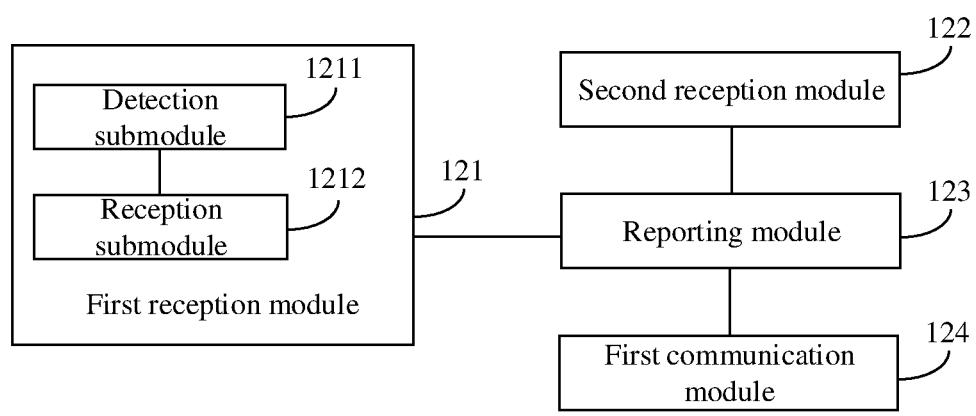
FIG. 16 is a block diagram illustrating another communication apparatus according to an example of the present disclosure.

FIG. 16 is a block diagram illustrating another communication apparatus according to an example of the present disclosure. As shown in FIG. 16, based on the example shown in FIG. 12, the first reception module 121 further comprises the following modules.

A detection submodule 1211 is configured to detect a broadcast signal at a fixed location in a current period.

A reception submodule 1212 is configured to receive the broadcast signal when the detection submodule 1211 detects the broadcast signal successfully.

In the above example, the implementation of detecting a broadcast signal at a fixed location in a current period, and receiving the broadcast signal when the broadcast signal is detected successfully, is relatively easy.

Figure 17:
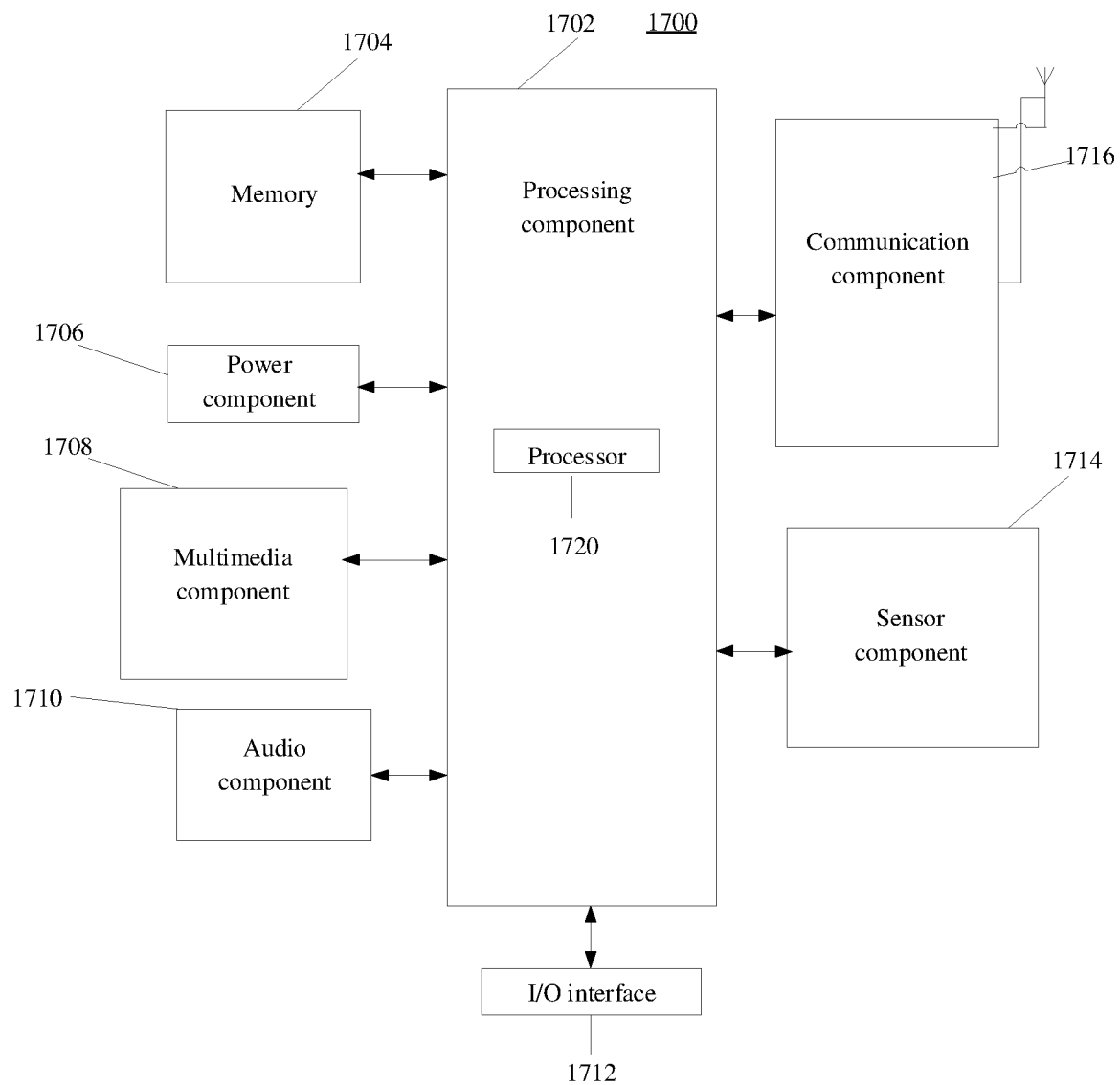
FIG. 17 illustrates a block diagram applicable to a communication apparatus according to an example of the present disclosure.

FIG. 17 illustrates a block diagram applicable to a communication apparatus according to an example of the present disclosure. For example, the apparatus 1700 may be a mobile phone, a computer, a digital broadcast terminal, a messaging device, a game console, a tablet device, medical equipment, fitness equipment, a personal digital assistant, or other user terminals.

Referring to FIG. 17, the apparatus 1700 may include one or more of the following components: a processing component 1702, a memory 1704, a power component 1706, a multimedia component 1708, an audio component 1710, an input/output (I/O) interface 1712, a sensor component 1714, and a communication component 1716.

The processing component 1702 usually controls the overall operation of the apparatus 1700, such as operations associated with display, telephone calls, data communications, camera operations, and recording operations. The processing component 1702 may include one or more processors 1720 to execute instructions to perform all or part of the steps in the methods described above. Moreover, the processing component 1702 may include one or more modules to facilitate interaction between the processing component 1702 and other components. For example, the processing component 1702 may include a multimedia module to facilitate interaction between the multimedia component 1708 and the processing component 1702.

When the communication apparatus locates within a power transmitting device, one processor 1720 in the processing component 1702 is configured to: transmit a broadcast signal after detecting a load change, where the broadcast signal carries a communication mode supported by the PTX and a current load state;
charge a first PRX after a handshake communication with the first PRX;
receive a communication state reported by the first PRX according to the broadcast signal;
communicate with the first PRX according to the communication state.

When the communication apparatus is located within a power receiving device, one processor 1720 in the processing component 1702 is configured to: receive a broadcast signal transmitted by a power transmitter (PTX);
receive power from the PTX after a handshake communication with the PTX;
report a communication state to the PTX when determining that there is other load accessing the PTX according to the broadcast signal;
communicate with the PTX according to the communication state.

The memory 1704 is configured to store various types of data to support operation at the apparatus 1700. Examples of these data include instructions for any application or method operating at the apparatus 1700, contact data, phone book data, messages, pictures, videos, and the like. The memory 1704 may be implemented by any type of volatile or non-volatile storage device or a combination thereof, such as a static random access memory (SRAM), an electrically erasable programmable read only memory (EEPROM), an erasable programmable read only memory (EPROM), a programmable read only memory (PROM), a read only memory (ROM), a magnetic memory, a flash memory, a disk or an optical disk.

The power component 1706 provides power to various components of the apparatus 1700. The power component 1706 may include a power management system, one or more power sources, and other components associated with power generated, managed, and distributed for the apparatus 1700.

The multimedia component 1708 includes a screen that provides an output interface between the apparatus 1700 and a user. In some examples, the screen may include a liquid crystal display (LCD) and a touch panel (TP). If the screen includes a touch panel, the screen may be implemented as a touch screen to receive input signals from the user. The touch panel includes one or more touch sensors to sense touches, slides, and gestures on the touch panel. The touch sensor may not only sense the boundary of touch or slide actions but also detect the duration and pressure associated with touch or slide operations. In some examples, the multimedia component 1708 includes a front camera and/or a rear camera. When the apparatus 1700 is in an operation mode, such as a shooting mode or a video mode, the front camera and/or the rear camera may receive external multimedia data. Each of the front and rear cameras may be a fixed optical lens system or have a focal length and an optical zoom capability.

The audio component 1710 is configured to output and/or input audio signals. For example, the audio component 1710 includes a microphone (MIC) configured to receive an external audio signal when the apparatus 1700 is in an operation mode, such as a call mode, a recording mode, and a voice recognition mode. The received audio signal may be further stored in the memory 1704 or transmitted via the communication component 1716. In some examples, the audio component 1710 also includes a loudspeaker for outputting an audio signal.

The I/O interface 1712 provides an interface between the processing component 1702 and a peripheral interface module which may be a keyboard, a click wheel, a button, or the like. These buttons may include, but are not limited to a home button, a volume button, a start button, and a lock button.

The sensor component 1714 includes one or more sensors for providing a status assessment in various aspects to the apparatus 1700. For example, the sensor component 1714 may detect an open/closed state of the apparatus 1700, and the relative positioning of components, for example, the component is a display and a keypad of the apparatus 1700. The sensor component 1714 may also detect a change in position of the apparatus 1700 or a component of the apparatus 1700, the presence or absence of a user in contact with the apparatus 1700, the orientation or acceleration/deceleration of the apparatus 1700 and a change in temperature of the apparatus 1700. The sensor component 1714 may include a proximity sensor configured to detect the presence of nearby objects without any physical contact. The sensor component 1714 may also include a light sensor, such as a CMOS or CCD image sensor, for use in imaging applications. In some examples, the sensor component 1714 may also include an acceleration sensor, a gyro sensor, a magnetic sensor, a pressure sensor, or a temperature sensor.

The communication component 1716 is configured to facilitate wired or wireless communication between the apparatus 1700 and other devices. The apparatus 1700 may access a wireless network based on a communication standard, such as WiFi, 2G or 3G, or a combination thereof. In an example, the communication component 1716 receives broadcast signals or broadcast associated information from an external broadcast management system via a broadcast channel. In an example, the communication component 1716 also includes a near field communication (NFC) module to facilitate short range communication. For example, the NFC module may be implemented based on a radio frequency identification (RFID) technology, an infrared data association (IrDA) technology, an ultra wide band (UWB) technology, a Bluetooth (BT) technology, and other technologies.

In an example, the apparatus 1700 may be implemented by one or more application specific integrated circuits (ASICs), digital signal processors (DSPs), digital signal processing devices (DSPDs), programmable logic devices (PLDs), a field programmable gate array (FPGA), a controller, a microcontroller, a microprocessor or other electronic elements for performing the above methods.

In an example, there is also provided a non-transitory computer readable storage medium including instructions, such as a memory 1704 including instructions, where the instructions are executable by the processor 1720 of the apparatus 1700 to perform the method as described above. For example, the non-transitory computer readable storage medium may be a ROM, a random access memory (RAM), a CD-ROM, a magnetic tape, a floppy disk, and an optical data storage device.

For the apparatus examples, since they basically correspond to the method examples, reference may be made to the partial description of the method examples. The apparatus examples described above are merely illustrative, wherein the units described as separate components may or may not be physically separated, and the components displayed as units may or may not be physical units, i.e., may be located in one place or may be distributed to multiple network units. Some or all of the modules may be selected according to actual needs to achieve the objectives of the present disclosure. Those of ordinary skill in the art can understand and implement the present disclosure without any creative effort.

It shall be noted that the relational terms such as "first" and "second" used herein are merely intended to distinguish one entity or operation from another entity or operation rather than to require or imply any such actual relation or order existing between these entities or operations. Also, the term "including", "containing" or any variation thereof is intended to encompass non-exclusive inclusion, so that a process, method, article or device including a series of elements includes not only those elements but also other elements not listed explicitly or those elements inherent to such a process, method, article or device. Without more limitations, an element defined by the statement "including a . . . " shall not be precluded to include additional same elements present in a process, method, article or device including the elements.

Other embodiments of the present disclosure will be readily apparent to those skilled in the art after considering the specification and practicing the contents disclosed herein. The present application is intended to cover any variations, uses, or adaptations of the present disclosure, which follow the general principle of the present disclosure and include common knowledge or conventional technical means in the art that are not disclosed in the present disclosure. The specification and examples are to be regarded as illustrative only. The true scope and spirit of the present disclosure are pointed out by the following claims.

It is to be understood that the present disclosure is not limited to the precise structures that have described and shown in the drawings, and various modifications and changes can be made without departing from the scope thereof. The scope of the disclosure is to be limited only by the appended claims.

The invention claimed is:

1. A communication method, applied to a power transmitter (PTX) supporting multiple coils, and comprising:
    transmitting a broadcast signal in response to detecting a load change of the PTX, wherein the broadcast signal carries a communication mode supported by the PTX and a current load state of the PTX, wherein the current load state indicates whether there is load currently accessing the PTX, and varies along with the load change;
    charging a first power receiver (PRX) after a handshake communication with the first PRX;
    receiving a communication state reported by the first PRX according to the broadcast signal; and
    communicating with the first PRX according to the communication state;
    wherein the method further comprises:
    charging a second PRX before the transmitting the broadcast signal in response to detecting the load change of the PTX;
    retransmitting a broadcast signal in response to detecting that the second PRX has been removed;
    receiving a communication request transmitted by the first PRX according to the retransmitted broadcast signal, wherein the communication request is configured to request the PTX returning to an in-band enhanced communication state; and
    performing an in-band enhanced communication with the first PRX according to the communication request.

2. The method according to claim 1, further comprising:
    after performing the in-band enhanced communication with the first PRX according to the communication request,
    performing an out-of-band communication with a third PRX in response to detecting access by the third PRX supporting the out-of-band communication;
    transmitting, to the first PRX, instruction information configured to instruct reducing an in-band communication rate to a preset rate; and
    performing a low rate in-band communication with the first PRX at the preset rate.

3. The method according to claim 1, further comprising:
    agreeing on a low rate in-band communication mode with a PRX including the first PRX;
    the communicating with the first PRX according to the communication state, comprises:
    performing a low rate in-band communication with the first PRX in the low rate in-band communication mode according to a low rate communication state.

4. The method according to claim 1, wherein the transmitting a broadcast signal in response to detecting a load change of the PTX, comprises:
    transmitting the broadcast signal periodically at a fixed location in response to detecting the load change of the PTX.

5. A power transmitter (PTX), comprising:
    a processor; and
    a storage storing instructions executable by the processor;
    wherein the processor is configured to:
    transmit a broadcast signal in response to detecting a load change of the PTX, wherein the broadcast signal carries a communication mode supported by the PTX and a current load state of the PTX, wherein the current load state indicates whether there is load currently accessing the PTX, and varies along with the load change;
    charge a first power receiver (PRX) after a handshake communication with the first PRX;
    receive a communication state reported by the first PRX according to the broadcast signal; and
    communicate with the first PRX according to the communication state;
    wherein the processor is further configured to:
    charge a second PRX before the transmitting the broadcast signal in response to detecting the load change of the PTX;
    retransmit a broadcast signal in response to detecting that the second PRX has been removed;
    receive a communication request transmitted by the first PRX according to the retransmitted broadcast signal, wherein the communication request is configured to request the PTX returning to an in-band enhanced communication state; and
    perform an in-band enhanced communication with the first PRX according to the communication request.

6. A communication method, applied to a power receiver (PRX), and comprising:

receiving a broadcast signal transmitted by the PTX according to claim 5;

receiving power from the PTX after a handshake communication with the PTX;

reporting a communication state to the PTX in response to determining that there is other load accessing the PTX according to the broadcast signal; and communicating with the PTX according to the communication state.

7. The method according to claim 6, further comprising:

receiving an updated broadcast signal transmitted by the PTX after communicating with the PTX according to a low rate communication state;

transmitting a communication request to the PTX according to the updated broadcast signal, wherein the communication request is configured to request the PTX returning to an in-band enhanced communication state; and performing an in-band enhanced communication with the PTX.

8. The method according to claim 7, further comprising:

receiving instruction information transmitted by the PTX after performing the in-band enhanced communication with the PTX, wherein the instruction information is configured to instruct reducing an in-band communication rate to a preset rate; and performing a low rate in-band communication with the PTX at the preset rate according to the instruction information.

9. The method according to claim 6, further comprising:

agreeing on a low rate in-band communication mode with the PTX;

the communicating with the PTX according to the communication state, comprises:

performing a low rate in-band communication with the PTX in the low rate in-band communication mode according to a low rate communication state.

10. The method according to claim 6, wherein the receiving a broadcast signal transmitted by the PTX, comprises:

detecting a broadcast signal at a fixed location in a current period; and receiving the broadcast signal when detecting the broadcast signal successfully.

11. A power receiver (PRX), comprising:

a processor; and a storage storing instructions executable by the processor;

wherein the processor is configured to:

receive a broadcast signal transmitted by the PTX according to claim 5;

receive power from the PTX after a handshake communication with the PTX;

report a communication state to the PTX in response to determining that there is other load accessing the PTX according to the broadcast signal; and communicate with the PTX according to the communication state.

12. The PTX according to claim 5, wherein the processor is further configured to:

after performing the in-band enhanced communication with the first PRX according to the communication request, perform an out-of-band communication with a third PRX in response to detecting access by the third PRX supporting the out-of-band communication;

transmit, to the first PRX, instruction information configured to instruct reducing an in-band communication rate to a preset rate; and perform a low rate in-band communication with the first PRX at the preset rate.

13. The PTX according to claim 5, wherein the processor is further configured to:

agree on a low rate in-band communication mode with a PRX including the first PRX; and perform a low rate in-band communication with the first PRX in the low rate in-band communication mode according to a low rate communication state.

14. The PTX according to claim 5, wherein the processor is further configured to:

transmit the broadcast signal periodically at a fixed location in response to detecting the load change of the PTX.

* * * * *